United States Patent Office 3,047,471
Patented July 31, 1962

3,047,471
METHOD OF REFINING AMYLOGLUCOSIDASE
Thomas L. Hurst and Almeria W. Turner, Decatur, Ill.
No Drawing. Filed Sept. 26, 1960, Ser. No. 58,206
13 Claims. (Cl. 195—66)

This invention relates to refining amyloglucosidase preparations to remove carbohydrate-synthesizing enzymes therefrom, e.g., isomaltose synthetase and maltose transglucosidase, whereby the refined enzyme can hydrolyze starch and its intermediate hydrolysis products more extensively to glucose.

The amyloglucosidase preparations contemplated by this invention are derived from molds and bacteria, generally by submerged fermentation, but by other techniques also. The enzyme preparation is generally in the form of a filtered or centrifuged fermentation beer, but it may have other forms. Among these are: (1) the whole fermentation mixture or culture including the microorganism, (2) dried whole culture, (3) dried fermentation beer, (4) aqueous extract of dried whole culture, and (5) a concentrated dried material obtained by precipitating the starch-hydrolyzing enzyme from the filtered or centrifuged fermentation beer with a dehydrating agent such as acetone or ethanol.

The principal starch-hydrolyzing enzyme in the preparations contemplated by this invention has been given several different names. Among these are gamma amylase, glucamylase, starch glucogenase, maltase, and amyloglucosidase. The enzyme is distinguished from other starch hydrolyzing enzymes by its property of hydrolyzing starch to glucose unaccompanied by the concurrent formation of substantial amounts of low molecular weight intermediate hydrolytic products such as maltose, maltotriose, higher sugars, and soluble dextrins. The enzyme appears to function by removing glucose units one at a time starting at the non-reducing end of a starch chain. The enzyme also hydrolyzes maltose, maltotriose, and other intermediate hydrolytic products of starch to glucose.

Examples of genera of microorganisms which can be cultured by known methods to yield whole fermentation mixtures and fermentation beers containing commercially attractive concentrations of amyloglucosidase are Aspergillus, Mucor, Clostridinum, and Rhizopus. The following sub-genera are good producers of amyloglucosidase: *Aspergillus oryzae, Clostridium acetobutylicum, Rhizopus delemar, Aspergillus niger, Aspergillus phoenicis,* and *Aspergillus flavus.*

The preparation of amyloglucosidase in the form of whole cultures and fermentation beers is described in United States Patents 2,557,078; 2,881,115 and 2,893,921. Purification of a crude amyloglucosidase preparation, the water extract of *Rhizopus delemar,* is described at pages 3359–3365, volume 73 of the Journal of the American Chemical Society.

We have observed that amyloglucosidase preparations produced according to the foregoing United States patents are unable to hydrolyze starch or starch-derived substrate completely to glucose. At commercially feasible initial concentrations of starch-derived substrate, the graph of the amyloglucosidase hydrolysis, wherein the ratio of the weight of glucose formed to the weight of hydrolyzate dry substance is plotted as ordinate against hydrolysis time as abscissa, either levels off at about 0.86 or "peaks" at about that value and then declines. The numerical value of D at the leveling off or peak region is referred to hereinafter as the glucogenic activity of the amyloglucosidase composition, where D is the percent by weight of glucose in the total solids. Attention is called to the fact that the glucogenic activity of an amyloglucosidase preparation has no necessary connection with the unit potency of the composition as determined according to United States Patent 2,881,115.

In the manufacture of crystalline glucose by the amyloglucosidase hydrolysis of starch and its intermediate hydrolytic products, as described in United States Patents 2,531,999; 2,567,000 and 2,583,451, and as suggested in United States Patent 2,881,115, it is generally desirable to obtain the highest possible conversion or hydrolysis of starchy substrate to glucose. High degree of hydrolysis facilitates the crystallization of glucose from the concentrated hydrolyzate because the non-glucose hydrolysis products (maltose, isomaltose, higher sugars and dextrins) inhibit the glucose crystallization. Also, high degree of hydrolysis increases the yield of glucose while decreasing the yield of often unwanted mother liquor solids. Although useful enzyme processes for the manufacture of crystalline glucose from starch and starch hydrolysis products can be based on the prior art amyloglucosidase preparations, those processes would obviously be improved if the enzyme preparations were capable of hydrolyzing the substrate to glucose to a substantially greater extent, i.e., if their glucogenic activities were greater.

We have discovered a simple inexpensive method for treating the prior art amyloglucosidase preparations to increase their glucogenic activities significantly. When treated by our method and then used to hydrolyze starch in the conventional manner, the prior art amyloglucosidase preparations yield 91–95 D in the hydrolyzate instead of the typical lower values averaging about 86 D. According to our method, an aqueous solution or dispersion of the amyloglucosidase preparation is first mixed with a small proportion of a selected protein precipitant or coagulant, then filtered, centrifuged, or decanted to separate the liquid and solid portions of the mixture. The liquid portion contains the treated or purified amyloglucosidase preparation. It may be used as such in the hydrolysis of starch and intermediate starch hydrolysis products to glucose, or it may be concentrated, evaporated to dryness, or dehydrated with a water-miscible organic liquid such as acetone or ethanol prior to use.

The amyloglucosidase preparation may contain material insoluble in water, but its contents of amyloglucosidase and interfering carbohydrate-synthesizing enzymes dissolve in the aqueous medium of our process and are available for reaction with the selected protein precipitant or adsorbent. Usually, and preferably, the amyloglucosidase preparation is in the form of a filtered or centrifuged fermentation beer, i.e., a clear, though colored, aqueous solution. Our process is applicable, however, to amyloglucosidase preparations in the form of aqueous solutions of the enzymes containing suspended insoluble material, e.g., whole fermentation culture.

Water is the preferred reaction medium in our method, but small proportions of other liquids such as acetone, ethanol, ethyl acetate, and glycerol may be present in the medium.

The indications are that our treatment removes one or more carbohydrate synthesizing enzymes from the original amyloglucosidase preparation, and that maltose transglucosidase is among those enzymes removed. The identity and functioning of maltose transglucosidase are discussed by Pan et al. (Arch. Biochem. Biophys. 42, 421–434) and by Pazur and French (J. Biol. Chem. 196, 265–272). Separation of solids, or precipitate, from liquor is necessary in our process. The carbohydrate synthesizing enzymes, though precipitated by or adsorbed on the selected precipitant or adsorbent, are still active and can exert their normal effect when contacted with starch or its hydrolysis products.

According to our invention, lignin and tannic acid are suitable agents for treating the amyloglucosidase preparations. Alkali lignin recovered from alkali wood pulp liquors is the preferred form of lignin. It is insoluble in water alone, but soluble in water solutions of the strong alkalis such as sodium hydroxide. It is available commercially in the "free" or "acid" form, which requires alkali for solution, and in the sodium-salt form, which dissolves in warm water. Any of the commercially available forms of crude and refined tannic acid are suitable. Tannic acid is soluble in water.

According to our invention, the protein adsorbent or precipitant is preferably dissolved in water, or in aqueous alkali if necessary to obtain solution, and then mixed thoroughly with the aqueous solution or dispersion of the amyloglucosidase preparation. Since the tannic acid and the alkali salt of lignin are soluble in water, they may be added in dry form to the amyloglucosidase solution. Even the lignin may be added, without preliminary solution in aqueous alkali, if it is added as a water slurry of undried finely divided precipitate obtained by neutralizing its alkali solution. Mixtures of tannic acid and lignin may be used. The active precipitant is the free acid or the anion of the acid (lignin and tannic acid are weak organic acids). The particular cation or cations associated with the refining reagent play no known part in the functioning of the reagent according to our invention. In the appended claims the terms "lignin" and "tannic acid" are to be regarded as equivalent to the water-soluble salts of the indicated materials, e.g., the alkali metal salts (sodium, potassium, etc.), ammonium and quaternary ammonium salts (tetramethyl ammonium, etc.), and so on.

We have found that the preferred pH of our treatment ranges from 3 to 4. We have also found that a significant increase in the glucogenic activity of the amyloglucosidase preparation can be obtained at pH values considerably below 3 if the treatment temperature is kept low to minimize enzyme inactivation, and that pH 5 is about the upper limit of treatment pH according to our invention. At a treatment pH above 5, our method provides little, if any, increase in the glucogenic activity of the amyloglucosidase preparations.

The preferred temperature of our treatment is room or ambient temperature of 20°–40° C. Results at temperatures below 20° C. and down to freezing are useful and satisfactory except for the cost and inconvenience of providing the lower temperatures. Temperatures above 55°–60° C. should be avoided because of the tendency to inactivate an appreciable proportion of the amyloglucosidase.

About 0.05 part by weight of a purified lignin per 100 parts by weight of amyloglucosidase solution is the minimum ratio for increasing the glucogenic activity of the solution significantly. The preferred proportion is about 0.2 to 0.4 part per 100 parts of amyloglucosidase solution. Excellent results are obtained with up to 3 parts of purified lignin per 100 parts by weight of enzyme solution, but at higher cost than in the preferred range. Still higher proportions yield treated amyloglucosidase preparations with increased glucogenic activity, but the amyloglucosidase potency or strength of the treated preparation is significantly reduced when the proportion exceeds 2–3 parts by weight of purified lignin per 100 parts by weight of amyloglucosidase solution. If the lignin contains inert material, the ratio of lignin to amyloglucosidase solution increases correspondingly without appreciably reducing the amyloglucosidase potency of the preparation.

Tannic acid is nearly as effective on a weight basis as purified lignin in our process. The preferred weight ratio of tannic acid to amyloglucosidase solution is 0.25 to 0.5%. The lower limit of effectiveness is about 0.05%, but substantially larger amounts of tannic acid than lignin can be used without affecting the amyloglucosidase potency. For example, the potency is substantially unaffected when the proportion of tannic acid is 5% of the enzyme solution. However, such large proportions are of little benefit, and the process is simply more expensive.

The amyloglucosidase potency of fermentation beers, as measured according to the method described in United States Patent 2,881,115, and lying within the range of 10 to 150 units per milliliter, does not have a marked effect on the preferred pH or preferred reagent ratio in our method. On the other hand, if more potent amyloglucosidase solutions are prepared, as by precipitating the enzyme from a beer with alcohol and then dissolving the precipitate in a limited proportion of water, the above specified minimum weight ratios of lignin and tannic acid must be increased in direct proportion to the increased potency.

The time required for the protein precipitant to increase significantly the glucogenic power of the amyloglucosidase preparation according to our invention is quite short. Apparently all that is needed is uniform distribution of the protein precipitant throughout the amyloglucosidase solution. We have found that 15–30 minutes of moderate agitation is adequate, but that shorter times are also effective.

Our method is applicable to the prior art amyloglucosidase preparations generally. Although the commercially attractive amyloglucosidase preparations are generally derived from the Aspergillus genus (*Aspergillus niger*, *Aspergillus oryzae*, *Aspergillus phoenicis*, and *Aspergillus flavus* in particular), our method is effective on amyloglucosidase preparations obtained by the culturing of other microorganisms including members of the Mucor, Clostridium and Rhizopus genera.

The following examples are illustrative embodiments of our invention:

*Example 1*

This example illustrates the application of our method to an amyloglucosidase preparation obtained by filtering the culture beer of an *Aspergillus phoenicis* fermentation performed as described in Example 1 of United States Patent 2,893,921. The amyloglucosidase potency of the filtered beer is 90 units per milliliter, as determined according to the method described at lines 29–41, column 2, of the patent. Into one liter of the filtered beer at 30° C. and 4 pH is stirred 40 grams of a dilute sodium hydroxide solution containing 4 grams of purified lignin. The mixture is adjusted to 3.5 pH with 10 mls. of dilute hydrochloric acid, stirred for 30 minutes, then filtered through coarse filter paper. Aliquots of the original and treated beers are examined for ability to hydrolyze acid thinned corn starch paste or sirup as follows: 100 ml. aliquots of the thinned paste at 60° C. (30–35% solids by weight, 15 D.E., 4 pH, prepared by careful autoclaving of a 35% solids corn starch slurry at 1.9 pH with hydrochloric acid, cooling, and neutralizing to 4 pH with soda ash) are measured into several 4 ounce bottles and placed in an incubator at 60° C. Into each of half of the bottles is stirred 3.9 ml. of original broth and into each of the remaining bottles is stirred 4.2 ml. of the treated broth. One each of the two sets of bottles is withdrawn from the incubator after 48 hours and analyzed for glucose by the glucose-oxidase method described at page 109 in volume 31 (1959) of Analytical Chemistry. This is repeated on separate pairs of bottles at 72, 96, and 120 hours incubation. The analytical results are tabulated below:

| Incubation Time (Hours) | Glucose Content (Original Enzyme) | Glucose Content (Treated Enzyme) |
| --- | --- | --- |
| 48 | 83.3 | 90.4 |
| 72 | 84.5 | 89.2 |
| 96 | 85.7 | 91.0 |
| 120 | 86.1 | 92.7 |

When the foregoing example is repeated with the sole process variation of adjusting the pH of the beer-lignin mixture to 2, 4, 5 and 6 in separate treatments, it is found that the treatment at 6 pH is substantially ineffective, i.e., the treated and original beers are substantially alike in their starch-hydrolyzing ability. It is also found that appreciable amyloglucosidase potency is lost at pH 2.0.

Repetition of Example 1 with the sole process variation of using 10, 25, 100, and 300 grams of the lignin solution in separate treatments shows that one-half part by weight of lignin per 1,000 parts by weight of amyloglucosidase beer is about the lower limit of effectiveness, and that the amyloglucosidase potency of the treated beer is substantially reduced at 30 parts by weight of the lignin per 1,000 parts by weight of beer.

*Example 2*

This example illustrates our invention by improving the original amyloglucosidase beer of Example 1 with a tannic acid treatment. Example 1 is repeated with the exception that the 40 grams of 10% solution of lignin in dilute sodium hydroxide is replaced with 15 grams of a 20% by weight solution of purified tannic acid in water. Analytical results are tabulated below:

| Incubation Time (Hours) | Glucose Content (Original Enzyme) | Glucose Content (Treated Enzyme) |
| --- | --- | --- |
| 48 | 83.3 | 89.8 |
| 72 | 84.5 | 91.0 |
| 96 | 86.5 | 91.4 |
| 120 | 86.0 | 91.8 |

*Example 3*

This example illustrates the use of lignin according to our invention to increase the glucogenic activity of an amyloglucosidase preparation obtained from *Aspergillus niger*. The mold is cultured according to the directions given at lines 4–23, column 4 of United States Patent 2,557,078. The filtered beer contains 60 units of amyloglucosidase per milliliter. The procedure of Example 1 is repeated except that 5.8 ml. and 6.0 ml., respectively, of original and treated beers are stirred into the 100 ml. aliquots of acid thinned corn starch paste. The analytical results are tabulated below.

| Incubation Time (Hours) | Glucose Content (Original Enzyme) | Glucose Content (Treated Enzyme) |
| --- | --- | --- |
| 48 | 81.1 | 90.1 |
| 120 | 83.3 | 94.4 |

*Example 4*

This example illustrates the use of tannic acid according to our invention to increase the glucogenic activity of an amyloglucosidase preparation obtanied from *Aspergillus niger* as described in Example 3. Example 3 is repeated with the exception that 20 ml. of a 20% solution of tannic acid in water is added to one liter of filtered amyloglucosidase beer, and after mixng the pH of the solution is adjusted to 3.3.

For comparison of glucogenic activity 5.8 ml. of the original amyloglucosidase beer and 6.0 ml. of the treated beer are added to the acid-thinned starch substrate. The analytical results are tabulated below:

| Incubation Time (Hours) | Glucose Content (Original Enzyme) | Glucose Content (Treated Enzyme) |
| --- | --- | --- |
| 48 | 81.1 | 90.6 |
| 120 | 83.3 | 94.5 |

As used in the foregoing description and in the appended claims, the term "starch" designates all native starches whether derived from root, stem, or fruit of a plant, and whether waxy or non-waxy, i.e., whether composed of amylopectin or a mixture of amylopectin and amylose. The term starch, as used herein, includes also the separated fractions of non-waxy starch (amylose and amylopectin), the lightly oxidized starches, the acid-modified starches, the lightly thermally-modified starches or dextrins, and the starch derivatives (i.e., starch ethers and esters).

We claim:

1. The method of increasing the glucogenic activity of aqueous amyloglucosidase preparations which comprises mixing with said preparation at a pH within the range of 2 to 5 an effective amount of an amyloglucosidase-refining agent selected from the group consisting of lignin and tannic acid, and separating solids from aqueous solution, whereby an aqueous solution of amyloglucosidase having increased glucogenic activity is obtained.

2. The method of increasing the glucogenic activity of aqueous amyloglucosidase preparations which comprises mixing with said preparation at a temperature within the range of 0° to 60° C. and at a pH within the range of 2 to 5 an effective amount of an amyloglucosidase-refining agent selected from the group consisting of lignin and tannic acid, and separating solids from aqueous solution, whereby an aqueous solution of amyloglucosidase having increased glucogenic activity is obtained.

3. The method of increasing the glucogenic activity of aqueous amyloglucosidase preparations which comprises mixing with said preparation at a pH within the range of 2 to 5 an effective amount of an amyloglucosidase-refining agent selected from the group consisting of lignin and tannic acid, and separating solids from aqueous solution, whereby an aqueous solution of amyloglucosidase having increased glucogenic activity is obtained, the weight of said amyloglucosidase-refining agent per 100 parts by weight of said aqueous amyloglucosidase preparation being not less than about 0.05 part.

4. The method of increasing the glucogenic activity of aqueous amyloglycosidase preparations which comprises mixing with said preparation at a temperature within the range of 0° to 60° C. and at a pH within the range of 2 to 5 an effective amount of an amyloglucosidase-refining agent selected from the group consisting of lignin and tannic acid, and separating solids from aqueous solution, whereby an aqueous solution of amyloglucosidase having increased glucogenic activity is obtained, the weight of said amyloglucosidase-refining agent per 100 parts by weight of said aqueous amyloglucosidase preparation being not less than about 0.05 part.

5. A method according to claim 1 wherein the amyloglucosidase preparation is obtained from *Aspergillus phoenicis*.

6. A method according to claim 1 wherein the amyloglucosidase preparation is obtained from *Aspergillus niger*.

7. A method according to claim 1 wherein the amyloglucosidase preparation is obtained from *Aspergillus oryzae*.

8. A method according to claim 1 wherein the amyloglucosidase preparation is obtained from *Clostridium acetobutylicum*.

9. A method according to claim 1 wherein the amyloglucosidase preparation is obtained from *Aspergillus flavus*.

10. The method of hydrolyzing to glucose in aqueous medium a carbohydrate selected from the class consisting of starch and its intermediate hydrolysis products with an amyloglucosidase preparation refined according to claim 1.

11. The method of hydrolyzing to glucose in aqueous medium a carbohydrate selected from the class consisting of starch and its intermediate hydrolysis products with an amyloglucosidase preparation refined according to claim 2.

12. The method of hydrolyzing to glucose in aqueous medium a carbohydrate selected from the class consisting of starch and its intermediate hydrolysis products with an amyloglucosidase preparation refined according to claim 3.

13. The method of hydrolyzing to glucose in aqueous medium a carbohydrate selected from the class consisting of starch and its intermediate hydrolysis products with an amyloglucosidase preparation refined according to claim 4.

References Cited in the file of this patent

UNITED STATES PATENTS

| | | |
|---|---|---|
| 2,452,000 | Wallerstein et al. | Oct. 19, 1948 |
| 2,881,115 | Liggett et al. | Apr. 7, 1959 |
| 2,893,921 | Lenglois et al. | July 7, 1959 |
| 2,967,804 | Kerr | Jan. 10, 1961 |
| 2,970,086 | Kerr | Jan. 31, 1961 |

OTHER REFERENCES

Methods in Enzymology, Vol. I, pages 234 to 240, page 236 particularly relied on. 1955.